March 20, 1962   V. LINDNER   3,026,235
PROCESS FOR MAKING FALLER BARS AND THE LIKE
Filed Feb. 12, 1960
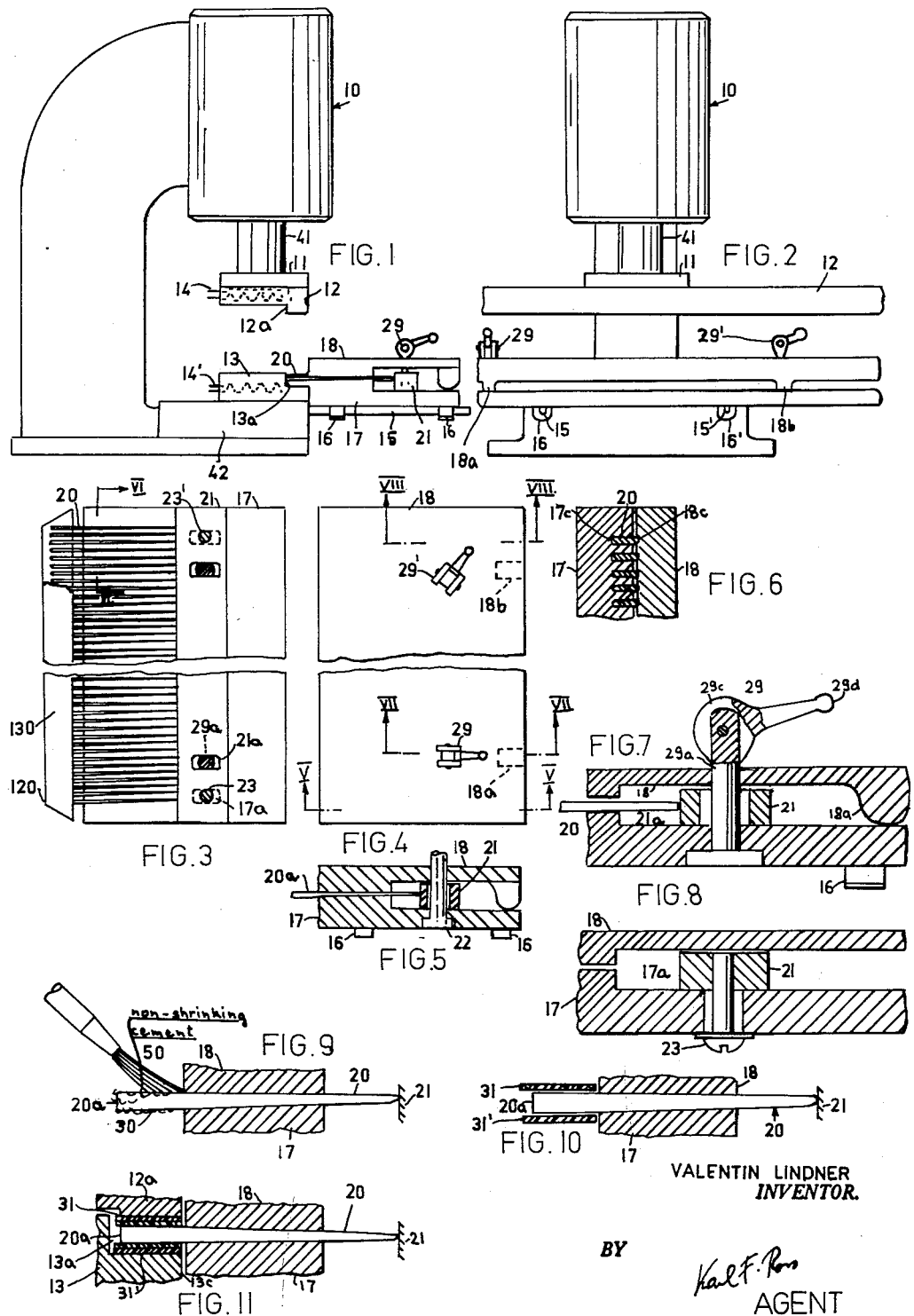
VALENTIN LINDNER
*INVENTOR.*
BY
Karl F. Ross
AGENT

United States Patent Office 3,026,235
Patented Mar. 20, 1962

3,026,235
PROCESS FOR MAKING FALLER BARS AND THE LIKE
Valentin Lindner, 570 Fort Washington Ave., New York, N.Y.
Filed Feb. 12, 1960, Ser. No. 8,300
3 Claims. (Cl. 156—305)

My present invention relates to the manufacture of comb-like arrays of elongated elements as more generally disclosed in my co-pending application Ser. No. 793,139, filed February 13, 1959, now Patent No. 2,992,672, issued July 18, 1961, of which the present application is a continuation-in-part.

In the above-mentioned co-pending application I disclose and claim an apparatus for positioning and bonding a multiplicity of elongated elements in a common base, adapted to be anchored in a metal holder, to form a faller bar or the like.

It is an object of the present invention to provide an improved process for producing faller bars or similar articles of the type described in the co-pending application identified above.

In accordance with the present invention, the necessary number of pins or needles are clamped next to one another in a suitable fixture and a non-shrinking cementitious adhesive is then applied to the projecting shanks of the clamped needles. The shanks thus coated are then sandwiched between two or more substantially flat strips of thermosetting material, each strip having previously been coated with the adhesive. The strips and the adhesive are thereafter consolidated under heat and pressure about the needle shanks.

According to a more particular feature of the invention, the consolidation step is carried just far enough to result in only partial curing of the thermosetting strips, so that the shanks are firmly imbedded in a practically monolithic although not actually homogeneous base which does not contain any voids capable of weakening the bond between the latter and the needles, even though the base is but incompletely set. The partially cured base supporting the comb-like array of needles is then inserted into a groove provided therefor in a metal holder to which the base is then bonded by the further application of heat to continue the curing process. Advantageously, a cement is interposed between the holder and the base to facilitate mutual adhesion and to strengthen the bond between the pins and the base.

I have found that a considerable variety of thermosetting materials, commercially available, are suitable for use according to the invention. It is advisable, however, to use a thermosetting material imparting at least limited resilience to the base after partial curing, rather than a material which in the same stage becomes brittle as well as hard. It is, therefore, a more specific feature of the invention to employ a rubber-base resin having thermosetting properties and adapted to be formed into strips. In this connection, I have found that acrylonitrile rubber latices compounded with penolic resins yield particularly effective results. Similar compositions derived from polyacrylic and styrene rubber polymers or co-polymers compounded with phenolic resins, vinyls or caseins have been found satisfactory. To facilitate adhesion between the thermosetting strips and the pins, the non-shrinking cement is preferably selected to be chemically compatible with the thermosetting material. Compatible cements include a number of rubber-modified resins (e.g. epoxy compounds), marketed under several trade names.

These and other objects, features and advantages will become more fully apparent from the following description, reference being made to the accompanying drawing in which:

FIG. 1 is a side-elevational view of an apparatus for practicing the process of the invention;

FIG. 2 is a partial front-elevational view of the apparatus of FIG. 1;

FIG. 3 is a top plan view of a clamp forming part of the apparatus of FIGS. 1 and 2, with the upper clamp jaw removed;

FIG. 4 is a view similar to FIG. 3 but with the upper clamp jaw in place;

FIG. 5 is a cross-sectional view taken on line 5—5 of FIG. 4;

FIG. 6 is a fragmentary sectional view taken on line 6—6 of FIG. 3;

FIG. 7 is a fragmentary cross-sectional view taken on line 7—7 of FIG. 5, drawn to a larger scale;

FIG. 8 is a fragmentary cross-sectional view taken on line 8—8 of FIG. 4, drawn to the same scale as FIG. 7; and FIGS. 9, 10 and 11 are fragmentary cross-sectional views of the clamp of FIGS. 3–8 at three successive stages of operation.

The apparatus shown in FIGS. 1 and 2 comprises a pneumatic press, generally designated 10, whose ram 41 terminates in a plate 11 carrying a male die member 12; the complementary female die member 13 is supported on the bed 42 of the press. Member 12 is provided with a depending ledge 12a fitting into a complementary recess 13a of member 13. Both die members 12 and 13 may be provided with internal heating means here shown schematically as resistors 14 and 14'.

Projecting outwardly from press bed 42 are two horizontal rails 15 and 15' which are engaged by pairs of lugs 16 and 16' on the underside of a lower clamp jaw 17 which is thus horizontally displaceable with respect to the die member 13 and which can also be completely detached from the press 10. An upper clamp jaw 18 rests on the lower jaw 17 and is maintained in proper alignment therewith by suitable means including a pair of locks 29, 29'. As best seen in FIG. 7, each of these locks comprises a stem 29a which passes through aligned holes in the two clamp jaws and terminates in a round head 29b received in a circular recess 17b on the underside of lower jaw 17. The top of stem 29a serves as a journal for a bifurcate cam 29c provided with an integral handle 29d so as to be operable to press the upper jaw 18 firmly against the lower jaw 17. The rotatability of head 29b in recess 17b enables the locks 29 and 29' to be swung around into various angular positions and to be conveniently operated in any such position.

A stop bar 21, provided with slots 21a for the passage of the lock stems 29a, is adjustably secured to the lower jaw 17 by means of bolts 23, 23' traversing slots 17a (FIG. 8) in member 17. The bar 21 serves as an abutment for the points of a series of pins or needles 20 which are lodged in relatively deep cuts 17c (FIG. 6) of lower jaw 17 and, upon a tightening of locks 29 and 29', are secured in position by means of the upper jaw 18 whose shallow corrugations 18c are aligned with the cuts 17c. The jaw 18 is also provided, on its side remote from the corrugations 18c, with integral bosses 18a, 18b positioned to bear upon the lower jaw 17 when the clamp is closed.

The butts 20a of pins 20 project from the closed clamp jaws 17 and 18 for a distance which is somewhat less than the width of the recess 13a of female die member 13. With the needle shanks securely held in parallel, coplanar alignment, their projecting rear extremities are coated with a non-shrinking plastic cement 30, such as an epoxy resin, which is put on by a brush 50 (FIG. 9) or other suitable means in such manner as to fill completely the interstices between the shanks. Advantageously, the coating 30 is allowed to stand in air for one or two minutes so as to undergo partial drying. One or more strips 31, 31' of thermosetting material are placed above and below the projecting shank portions 20a so as to extend slightly to the rear thereof (see FIG. 10), the width of the strips preferably corresponding to that of the ledge 12a and the recess 13a of die members 12 and 13. Before the strips 31 and 31' are placed in position, they are also coated with the aforementioned cement. Next, the clamp 17, 18 with the needles 20 and the strips 31, 31' is moved into the position illustrated in FIG. 1, whereupon the heaters 14, 14' are actuated and the ram 41 is caused to descend so as to compress the thermoplastic strips and the cement 30 around the shank extremities 20a. This final step has been illustrated in FIG. 11.

*Example*

A low-viscosity rubber-modified epoxy resin cement, selected to have minimum run-off (e.g. of viscosity from 500–900 cps.), is brushed onto the clamped shanks as previously described. The cement is permitted to become tacky, whereupon the thermosetting strips, previously coated with the cement, are applied. The nitrile-phenolic thermosetting strips require temperatures of 220° C. after 8 minutes, 204° C. after 10 minutes and 186° C. after 24 minutes for complete curing, according to the manufacturer's specifications, at a pressure of approximately 15 kilograms per square centimeter or 200 pounds per square inch. In the practice of the invention, however, substantially constant temperatures ranging between 100° and 200° C., and greatly reduced pressures of approximately 2 to 7 kilograms per square centimeter (about 30 to 100 pounds per square inch), are applied for a foreshortened treatment period of the order of 1 to 5 minutes in the press as described above, thereby only incompletely curing the base. The base may then be coated with either the same or a different cement and inserted into the groove of the metallic holder portion of a faller bar as shown, for instance, in my Patent No. 2,992,672 mentioned hereinbefore, or of some other, conventional type of faller bar. The metallic holder carrying the completed needle book 120 (FIG. 3), having the pins 20 imbedded in a polymeric base 130, is then exposed to temperatures of the order described above for a time sufficient to bond the base to the holder as well as to complete the curing of the base, e.g. for 30 minutes at 70° C. without added pressure.

The process as described may be modified by the use of other materials requiring different temperatures, pressures and treatment times, less than those needed for complete setting, to obtain partial curing in accordance with the invention. The ranges given above, however, will be applicable to many of the thermosetting constituents referred to, in particular the phenolic resins and the proteins (e.g. casein). These and other modifications and variations, readily apparent to persons skilled in the art, are intended to be included in the spirit and scope of my present invention except as further limited by the appended claims.

I claim:

1. A process for making a faller bar wherein a metallic holder has a recess accommodating the shanks of a set of needles projecting from said holder, comprising the steps of arranging said needles in parallel and coplanar alignment to form an assembly adapted to be secured to said holder, clamping said needles in aligned position with accessibility of their shanks, coating said shanks over their entire accessible length with a non-shrinking cementitious material, allowing said material to penetrate the interstices between said shanks, sandwiching the so coated shanks between two flat strips of thermosetting substance having a width substantially equal to the accessible length of said shanks and registering therewith, and consolidating said strips said material around said shanks by the application of sufficient heat and pressure to effect only partial curing of said thermosetting substance and said cementitious material, and completing the curing of said thermosetting substance and said cementitious material upon the introduction of said assembly into the holder.

2. A process according to claim 1, comprising the further step of coating said assembly with a heat-curing adhesive prior to its introduction into the holder.

3. A process according to claim 2, comprising the further step of curing said adhesive simultaneously with the completion of the curing of said thermosetting substance and said cementitious material upon the introduction of said assembly into the holder.

References Cited in the file of this patent

UNITED STATES PATENTS

| | | |
|---|---|---|
| 2,512,997 | Bixler | June 27, 1950 |
| 2,606,269 | Craig | Aug. 5, 1952 |